(12) United States Patent
Endou et al.

(10) Patent No.: US 9,503,312 B2
(45) Date of Patent: Nov. 22, 2016

(54) NETWORK MANAGEMENT SYSTEM (71) Applicant: YOKOGAWA ELECTRIC CORPORATION, Musashino-shi, Tokyo (JP)

(72) Inventors: Masahito Endou, Musashino (JP); Tomomi Shimamura, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 51 days.

(21) Appl. No.: 14/343,160

(22) PCT Filed: Jun. 21, 2013

(86) PCT No.: PCT/JP2013/067037
§ 371 (c)(1),
(2) Date: Mar. 6, 2014

(87) PCT Pub. No.: WO2014/002880
PCT Pub. Date: Jan. 3, 2014

(65) Prior Publication Data
US 2014/0233371 A1 Aug. 21, 2014

(30) Foreign Application Priority Data
Jun. 29, 2012 (JP) ................................ 2012-147174

(51) Int. Cl.
*H04L 12/26* (2006.01)
*H04L 12/24* (2006.01)
(Continued)

(52) U.S. Cl.
CPC ......... *H04L 41/04* (2013.01); *H04L 12/40182* (2013.01); *H04L 41/0654* (2013.01);
(Continued)

(58) Field of Classification Search
None
See application file for complete search history.

(56) References Cited

U.S. PATENT DOCUMENTS

| | | |
|---|---|---|
| 2003/0146932 A1 | 8/2003 | Weng et al. |
| 2006/0256801 A1 | 11/2006 | Endo |

(Continued)

FOREIGN PATENT DOCUMENTS

| | | |
|---|---|---|
| CN | 1855900 A | 11/2006 |
| EP | 2874466 A1 | 5/2015 |

(Continued)

OTHER PUBLICATIONS

Yamamoto, et al., "Field Wireless Solution Based on ISA100.11a to Innovate Instrumentation", vol. 53, No. 2, 2010, pp. 7-12.

(Continued)

*Primary Examiner* — Anh-Vu Ly
(74) *Attorney, Agent, or Firm* — Sughrue Mion, PLLC (57) ABSTRACT

It is to realize a network management system which can suppress to a minimum a time during which it is impossible to make a communication when a trouble occurs in any of field wireless management stations formed to be redundant. In a network management system in which field wireless management stations 11, 12 having gateway functions and system management functions incorporated are redundantly connected together, the field wireless management stations 11, 12 include at least switch modules 11b, 12b, and the plurality of field wireless management stations 11, 12 are connected to each other through a synchronizing cable 30 and synchronizing connectors CNa, CNb provided in the synchronizing cable 30, and switches SWm are connected in series to a synchronizing system which connects the switch modules 11b, 12b to each other to turn on and off the system.

5 Claims, 7 Drawing Sheets (51) Int. Cl.
*H04L 12/40* (2006.01)
*H04W 24/04* (2009.01)
*H04L 12/46* (2006.01)

(52) U.S. Cl.
CPC ............ *H04W 24/04* (2013.01); *H04L 12/462* (2013.01); *H04L 2012/4026* (2013.01)

(56) References Cited

U.S. PATENT DOCUMENTS

| | | | |
|---|---|---|---|
| 2007/0252612 A1 | 11/2007 | Sylvester | |
| 2009/0316628 A1* | 12/2009 | Enns et al. | 370/328 |
| 2009/0316706 A1 | 12/2009 | Hawley et al. | |
| 2011/0161538 A1 | 6/2011 | Decker | |
| 2012/0030753 A1* | 2/2012 | Bas | G06F 21/85 726/16 |
| 2012/0063330 A1* | 3/2012 | Mori et al. | 370/248 |
| 2012/0084400 A1* | 4/2012 | Almadi et al. | 709/219 |
| 2013/0021167 A1* | 1/2013 | Harper, Jr. | 340/870.01 |
| 2013/0179697 A1* | 7/2013 | Nicholas et al. | 713/300 |
| 2014/0233554 A1* | 8/2014 | Endou | 370/338 |
| 2014/0247764 A1* | 9/2014 | Kukosa | 370/311 |

FOREIGN PATENT DOCUMENTS

| | | |
|---|---|---|
| JP | 10-285202 A | 10/1998 |
| JP | 2001-118639 A | 4/2001 |
| JP | 2008-502216 A | 1/2008 |
| JP | 2010-146044 A | 7/2010 |
| WO | 2005/122533 A1 | 12/2005 |

OTHER PUBLICATIONS

Yamamoto, et al., "World's First Wireless Field Instruments Based on ISA100.11a", vol. 53, No. 2, 2010, pp. 13-16.
International Search Report dated Sep. 17, 2013 issued in International Application No. PCT/JP2013/067037 (PCT/ISA/210).
Written Opinion dated Sep. 17, 2013 issued in International Application No. PCT/JP2013/067037 (PCT/ISA/237).
Communication issued Jan. 28, 2016, issued by the European Patent Office in counterpart European Patent Application No. 13810727.1.

* cited by examiner

Related Art

FIG. 7

Related Art

NETWORK MANAGEMENT SYSTEM

TECHNICAL FIELD

The present invention relates to a network management system, and more particularly to a redundancy of a field wireless management function.

BACKGROUND ART

A communication between a field device and a control system in a process control system progresses to a wireless represented by a wireless communication standard ISA100.11a for an industrial automation which is determined by an ISA100 committee of an international learned society of instrumentation control (ISA: International Society of Automation) and issued in September, 2009 via a hybrid communication such as HART (a registered trademark) that a digital signal is superimposed on an analog communication of 4 to 20 mA and a digital communication such as FOUNDATION Fieldbus (a registered trademark) or PROFIBUS (a registered trademark) from an analog communication of 4 to 20 mA by a two-wire type signal wire.

By the hybrid communication or the digital communication, a quantity of information that can be used by a plant operation is outstandingly actively increased. As a result, versatile information such as a plurality of process quantities or diagnosis results which are transmitted by devices can be sent to a host system such as a DCS (Distributed Control System) or a device management system, so that facilities can be managed, previewed and maintained.

A field wireless technology that makes the communication between the field device and the control system wireless has many merits, in addition to the above-described merits, for instance, a wiring or an engineering cost can be reduced, devices can be installed in places where the wiring is difficult, and the devices are easily added or removed. Thus, when the above-described merits are put to practical use, it is possible to anticipate a realization of an instrumentation which has been impossible so far.

When the process control system based on the ISA100.11a is formed, a field wireless management station in which a gateway function and a system management function are incorporated is made to be redundant.

Figure 6:
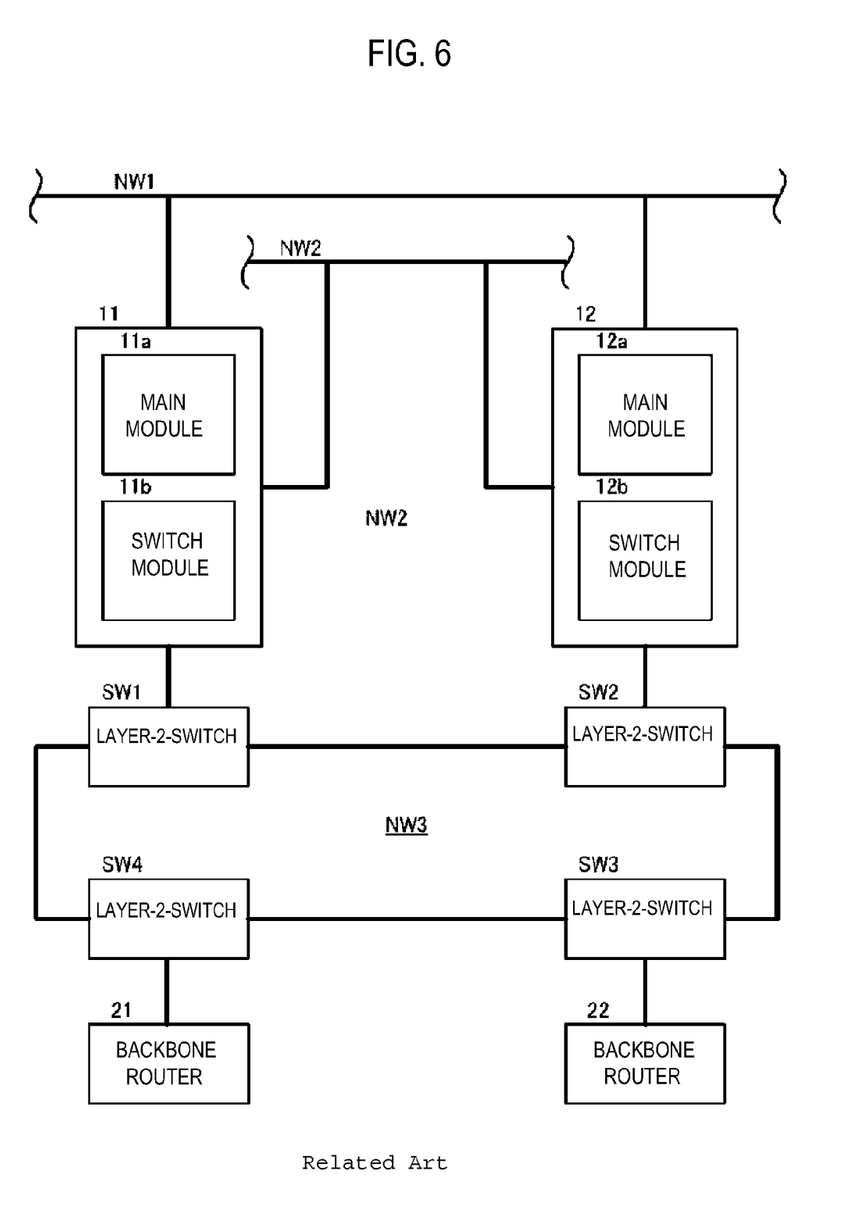
FIG. 6 is an explanatory view of a structure which shows an example of a conventional redundant connection of a field wireless management station.

FIG. 6 is an explanatory view of a structure which shows an example of a conventional redundant connection of the field wireless management station. In FIG. 6, the field wireless management stations 11 and 12 have the gateway functions and the system management functions incorporated. Main modules 11a and 12a and switch modules 11b and 12b are shown which are provided to realize these functions.

The field wireless management stations 11 and 12 are connected to a host network NW1 and connected to a synchronizing network NW2 to take synchronization between the field wireless management stations, and further connected to a backbone network NW3 including four layer-2-switches SW1 to SW4 which are connected together in the form of a loop to connect backbone routers 21 and 22 thereto.

Thus, the field wireless management stations 11 and 12 and the backbone routers 21 and 22 are respectively formed to be redundant.

Here, the four layer-2-switches SW1 to SW4 connected together in the form of the loop which form the backbone network NW3 can open an arbitrary port in accordance with, for instance, an RSTP (rapid spanning tree protocol).

Accordingly, for instance, when a communication trouble occurs due to a failure of any of the ports of the layer-2-switches, the failed port may be selectively opened and bypassed to continuously carry out a communication.

Problems that the Invention is to Solve

In non-patent literature 1, the concept of a field wireless solution based on the ISA100.11a and the concept of a field wireless system mainly including the DCS are disclosed.

In non-patent literature 2, a technique relating to a wireless field device and a field wireless system based on the ISA100.11a is disclosed.

Patent literature 1 discloses a technique that simplifies an establishment of a connection in a system which accesses to other system through an addressable and redundant gateway.

Patent literature 2 discloses a technique that early detects a failure of a duplex gateway by alternately using the duplex gateway.

PRIOR ART LITERATURE

Non-Patent Literature

Non-Patent Literature 1: Shuji Yamamoto and two other members, "Field Wireless Solution Based On ISA100.11a Which Reforms Instrumentation", Yokogawa Technical Information, Yokogawa Electric Corporation, 2010, Vol. 53 No. 2 (2010) P. 7-p. 12

Non-Patent Literature 2: Shuji Yamamoto and three other members, "World's First Wireless Field Instruments Based on ISA100.11a", Yokogawa Technical Report, Yokogawa Electric Corporation, 2010. Vol. 53 No. 2(2010) p. 13-p. 16

Patent Literature

Patent Literature 1: JP-T-2008-502216
Patent Literature 2: JP-A-10-285202

SUMMARY OF THE INVENTION

Problems that the Invention is to Solve

However, in the structure shown in FIG. 6, for instance, when one of the field wireless management stations 11 and 12 is put down due to a trouble or maintenance, a problem arises that all communication to the other field wireless management station which is not put down cannot be made until the layer-2-switch opens the port which the layer-2-switch blocks (for several ten seconds to several minutes).

Figure 7:
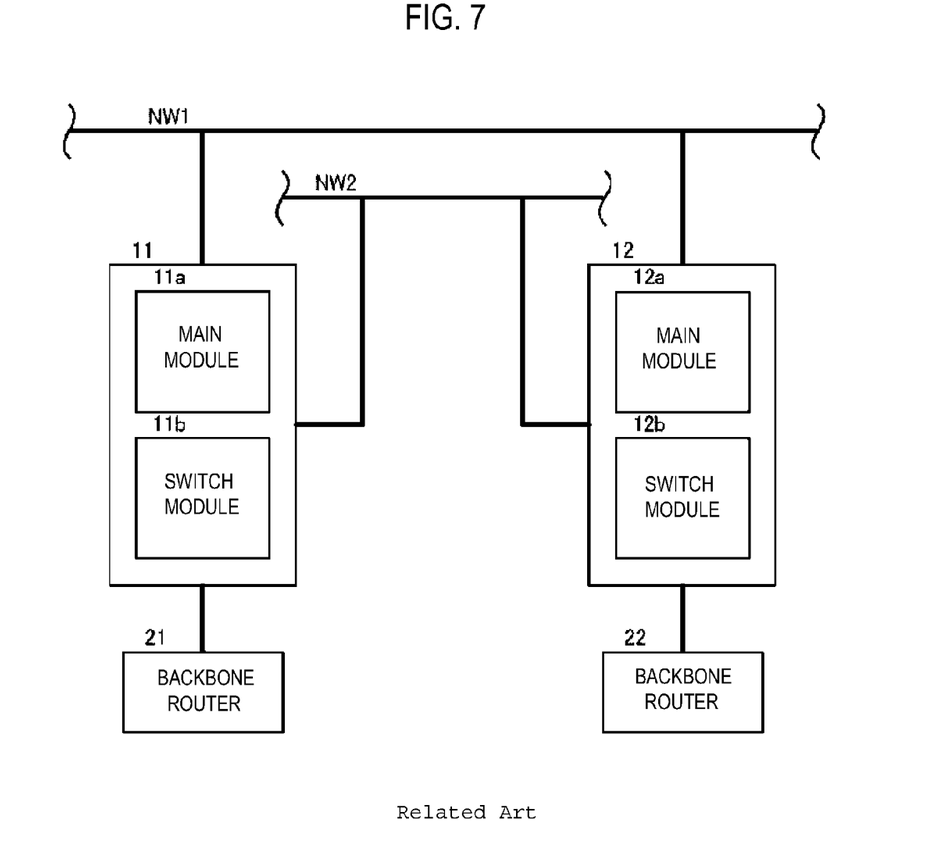
FIG. 7 is an explanatory view of a structure which shows another example of a conventional redundant connection of a field wireless management station.

Further, for instance, as shown in FIG. 7, when the two backbone routers 21 and 22 are respectively individually connected to the field wireless management stations 11 and 12 without passing through the backbone network NW3, if a trouble occurs in the field wireless management station 11 or 12, an operation of the backbone router 21 or 22 connected thereto is also unstable.

The present invention is devised by paying attention to these problems and it is an object of the present invention to realize a network management system which can suppress to a minimum a time during which it is impossible to make a communication when a trouble occurs in any of field wireless management stations formed to be redundant.

Means for Solving the Problems

The object of the present invention is achieved by below-described structures.

(1) A network management system in which field wireless management stations having gateway functions and system management functions incorporated are redundantly connected together,
wherein the field wireless management stations include at least switch modules, and
the plurality of field wireless management stations are connected to each other through a synchronizing cable and synchronizing connectors provided in the synchronizing cable, and switches are connected in series to a synchronizing system which connects the switch modules to each other to turn on and off the system.
(2) The network management system according to the above-described (1), wherein backbone routers are redundantly connected to each of the redundantly connected field wireless management stations through layer-2-switches which are connected together in the form of a loop.
(3) The network management system according to the above-described (1) or (2), wherein the plurality of redundantly connected field wireless management stations are connected so as to be individually identified by the synchronizing cable and the synchronizing connectors.
(4) The network management system according to any one of the above-described (1) to (3), wherein the synchronizing cable and the synchronizing connectors also include a power wire.
(5) The network management system according to any one of the above-described (1) to (4), wherein it is detected whether the synchronizing cable and the synchronizing connectors are pulled out from or inserted into at least one of the field wireless management stations in accordance with a function which individually identifies the plurality of redundantly connected field wireless management stations by the synchronizing cable and the synchronizing connectors.

Advantage of the Invention

In the present invention, when the switch provided in the synchronizing system which connects the switch modules to each other is turned on, the backbone routers can be respectively directly connected to the field wireless management stations. When the switch is turned off, the backbone routers can be respectively connected to the field wireless management stations through the layer-2-switches which are connected in the form of a loop.

MODE FOR CARRYING OUT THE INVENTION

Figure 1:
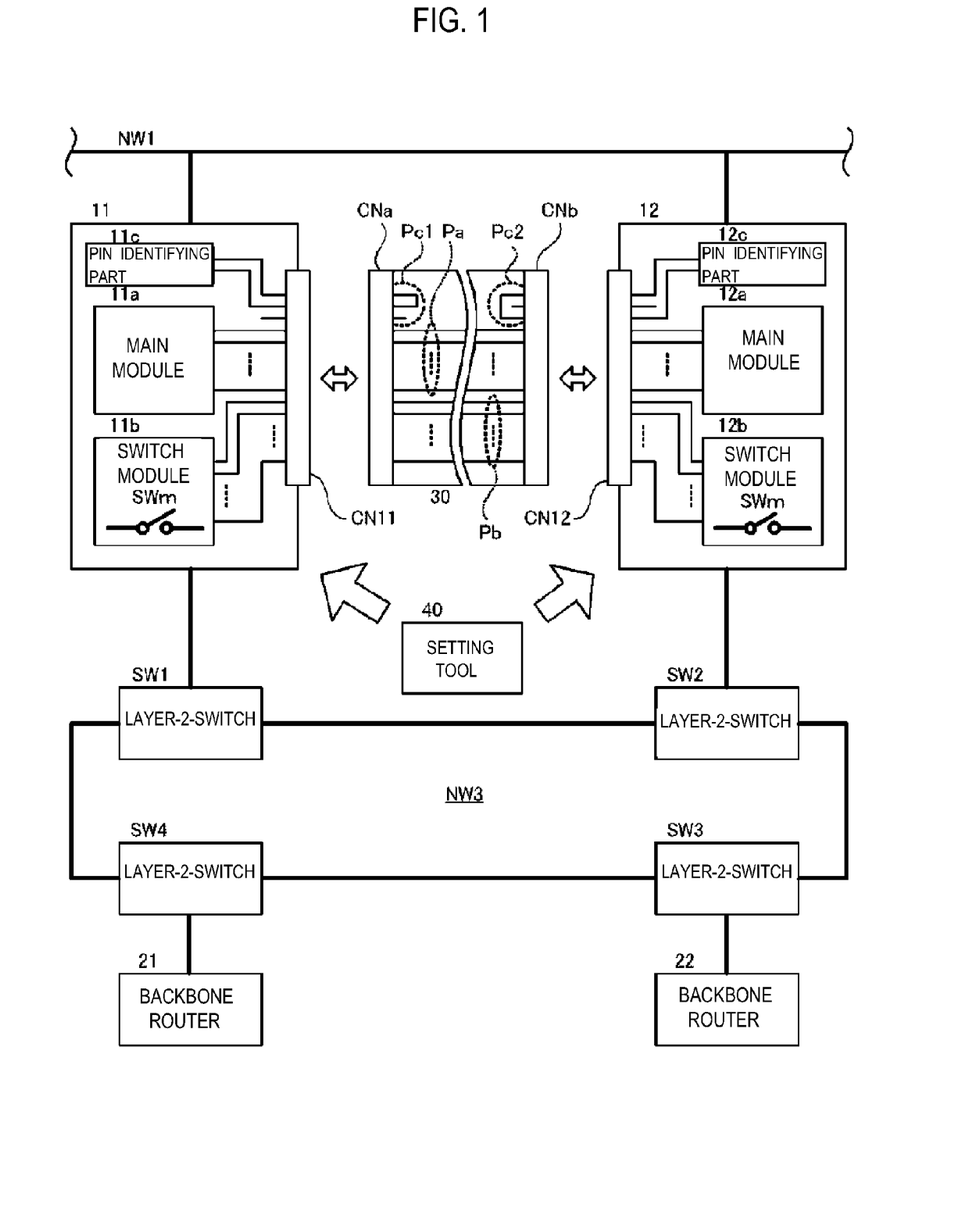
FIG. 1 is an explanatory view of a structure showing one exemplary embodiment of the present invention.

Now, an exemplary embodiment of a network management system according to the present invention will be described below by using the drawings. FIG. 1 is an explanatory view of a structure showing one exemplary embodiment of the present invention. Parts common to those shown in FIG. 6 are designated by the same reference numerals.

The network management system according to the present exemplary embodiment is a network management system in which field wireless management stations having gateway functions and system management functions incorporated are redundantly connected to each other. As shown in FIG. 1, in the field wireless management stations 11 and 12 of the network management system according to the present exemplary embodiment, pin identifying parts 11c and 12c, main modules 11a and 12a, switch modules 11b and 12b and connectors CN 11 and CN 12 are respectively provided.

Then, a synchronizing cable 30 is connected to the connectors CN 11 and CN 12, so that the main modules 11a and 12a and the switch modules 11b and 12b of the filed wireless management stations 11 and 12 are respectively connected to each other through the synchronizing cable 30.

Further, since the field wireless management stations 11 and 12 are individually identified by the pin identifying parts 11c and 12c, as shown in FIG. 1, pins of the connectors CN 11 and CN 12 that are respectively connected to the pin identifying parts 11c and 12c are different from each other.

The main module 11a, the switch module 11b and the pin identifying part 11c which form the field wireless management station 11 are mutually connected together through an inner bus not shown in the drawing. Further, the main module 12a, the switch module 12b and the pin identifying part 12c which form the field wireless management station 12 are also mutually connected together through an inner bus not shown in the drawing.

In one end of the synchronizing cable 30, a connector CNa is provided which is fitted and connected to the connector CN 11 of the one field wireless management station 11. In the other end, a connector CNb is provided which is fitted and connected to the connector CN 12 of the other field wireless management station 12.

Between the connectors CNa and CNb, are provided a first group of signal wires Pa which connect the main modules 11a and 12a to each other and a second group of signal wires Pb which connect the switch module 11b and 12b to each other.

In the vicinity of the connector CNa, a third group of signal wires Pc1 are provided which identify the one field wireless management station 11. In the vicinity of the connector CNb, a fourth group of signal wires Pc2 are provided which identify the other field wireless management station 12. These connectors CNa and CNb function as synchronizing connectors.

Then, in the switch modules 11b and 12b, switches SWm are provided which are connected in series to the second group of signal wires Pb for connecting the switch modules 11b and 12b to each other to turn on and off the group of signal wires Pb.

The turning on and off operations of the switches SWm are externally set by a setting tool 40. In the exemplary embodiment shown in FIG. 1, backbone routers 21 and 22 are redundantly connected to the field wireless management stations 11 and 12 through a backbone network NW3 including four layer-2-switches SW1 to SW4 which are connected together in the form of a loop, and the switches SWm are set to off states.

Figure 2:
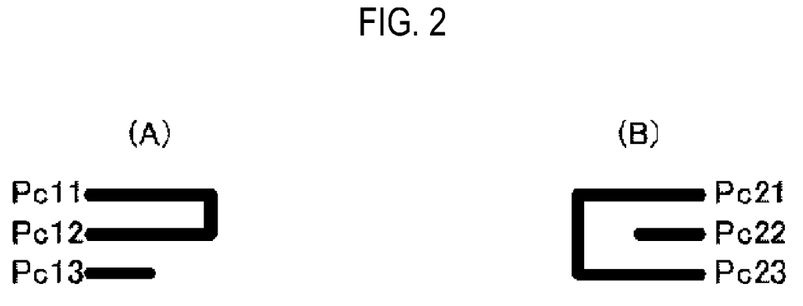
FIG. 2A and 2B are enlarged views of groups of signal wires in FIG. 1.

FIGS. 2(A) and 2(B) show enlarged views of the groups of signal wires for identifying the field wireless management stations 11 and 12. FIG. 2(A) shows the third group of signal wires Pc1 and FIG. 2(B) shows the fourth group of signal wires Pc2. In the third group of signal wires Pc1 shown in FIG. 2(A), signal wires Pc11 and Pc12 are short-circuit connected to each other. In the fourth group of signal wires Pc2 shown in FIG. 2(B), signal wires Pc21 and Pc23 are connected to each other in a short-circuit state.

Operations of the parts in the structure shown in FIG. 1 will be respectively described.

The main modules 11a and 12a are formed with a CPU or a memory. On the main modules 11a and 12a, an OS operates. The main modules 11a and 12a communicate with each other through the synchronizing cable 30 to make equalization of various kinds of information.

Further, the main modules 11a and 12a periodically monitor the fitted and connected states of the connectors CNa and CNb of the synchronizing cable 30 to the connectors CN 11 and CN 12 respectively through the inner buses not shown in the drawing.

Thus, when a short-circuit state of a prescribed identifying pin cannot be detected, it can be decided that the connectors are not fitted and connected to each other.

The switch modules 11b and 12b are network switches (hubs) and connected to each other through the synchronizing cable 30. The switches SWm are set to off states as mentioned above.

Figure 3:
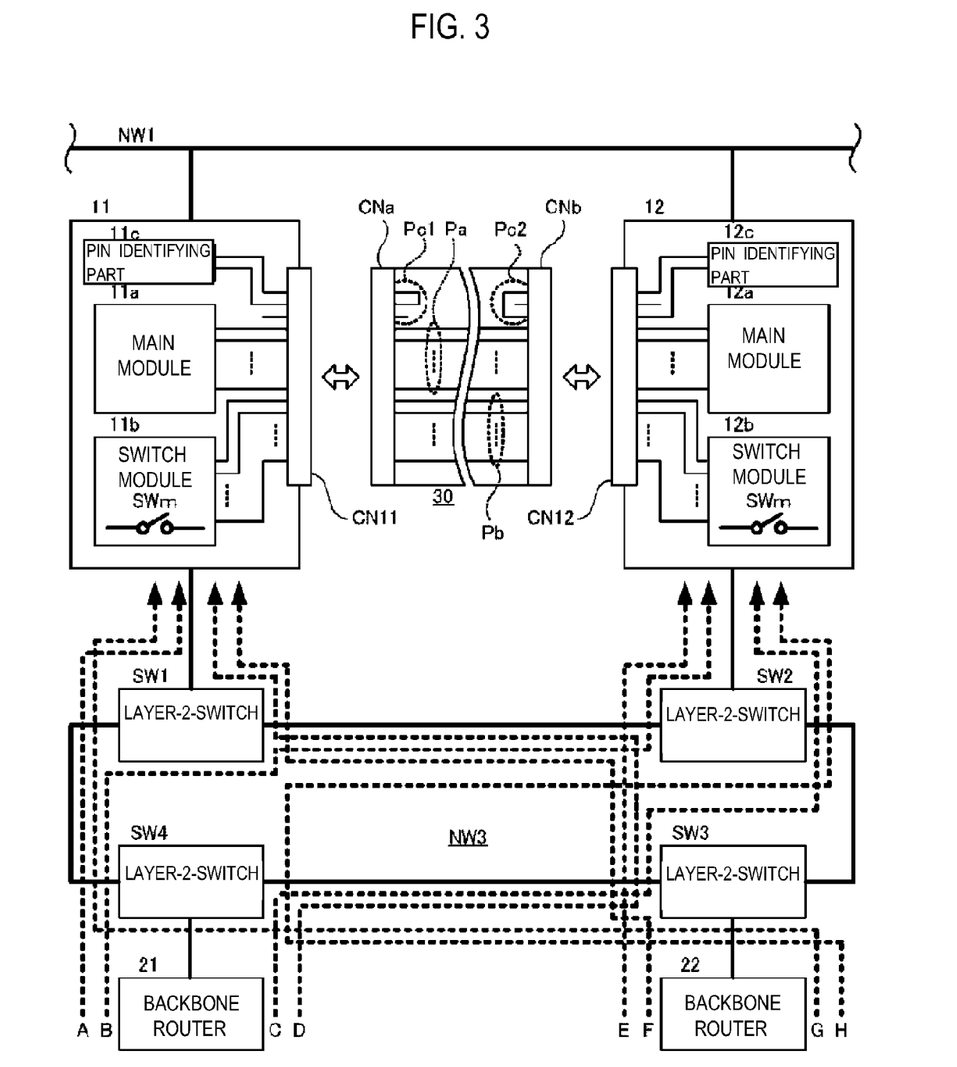
FIG. 3 is an explanatory view of a redundant connection in the structure shown in FIG. 1.

FIG. 3 is an explanatory view of a redundant connection in the structure shown in FIG. 1. As shown in FIG. 3, the backbone routers 21 and 22 are redundantly connected to the field wireless management stations 11 and 12 through the backbone network NW3 formed with the four layer-2-switches SW1 to SW4 which are connected together in the form of a loop.

The backbone router 21 is connected to the field wireless management station 11 through a rout A or D shown in FIG. 3, and connected to the field wireless management station 12 through a route B or C.

The above-described symbol A designates the route passing through the layer-2-switches respectively in order of SW4 and SW1.

The above-described symbol D designates the route passing through the layer-2-switched respectively in order of SW4, SW3, SW2 and SW1.

The above-described symbol B designates the route passing through the layer-2-switches respectively in order of SW4, SW1 and SW2.

The above-described symbol C designates the route passing through the layer-2-switches respectively in order of SW4, SW3 and SW2.

The backbone router 22 is connected to the field wireless management station 12 through a rout E or H shown in FIG. 3, and connected to the field wireless management station 11 through a route F or G.

The above-described symbol E designates the route passing through the layer-2-switches respectively in order of SW3 and SW2.

The above-described symbol H designates the route passing through the layer-2-switches respectively in order of SW3, SW4, SW1 and SW2.

The above-described symbol F designates the route passing through the layer-2-switches respectively in order of SW3, SW2 and SW1.

The above-described symbol G designates the route passing through the layer-2-switches respectively in order of SW3, SW4 and SW1.

When the connector CNa of the synchronizing cable 30 is fitted and connected to the connector CN 11, the pin identifying part 11c provided in the field wireless management station 11 detects the short-circuit connection of the signal wires Pc11 and Pc12 in the third group of signal wires Pc1 to identify the field wireless management station 11, and outputs an identified result to the main module 11a.

When the connector CNb of the synchronizing cable 30 is fitted and connected to the connector CN 12, the pin identifying part 12c provided in the field wireless management station 12 detects the short-circuit connection of the signal wires Pc21 and Pc23 in the fourth group of signal wires Pc2 to identify the field wireless management station 12, and outputs an identified result to the main module 12a.

Figure 4:
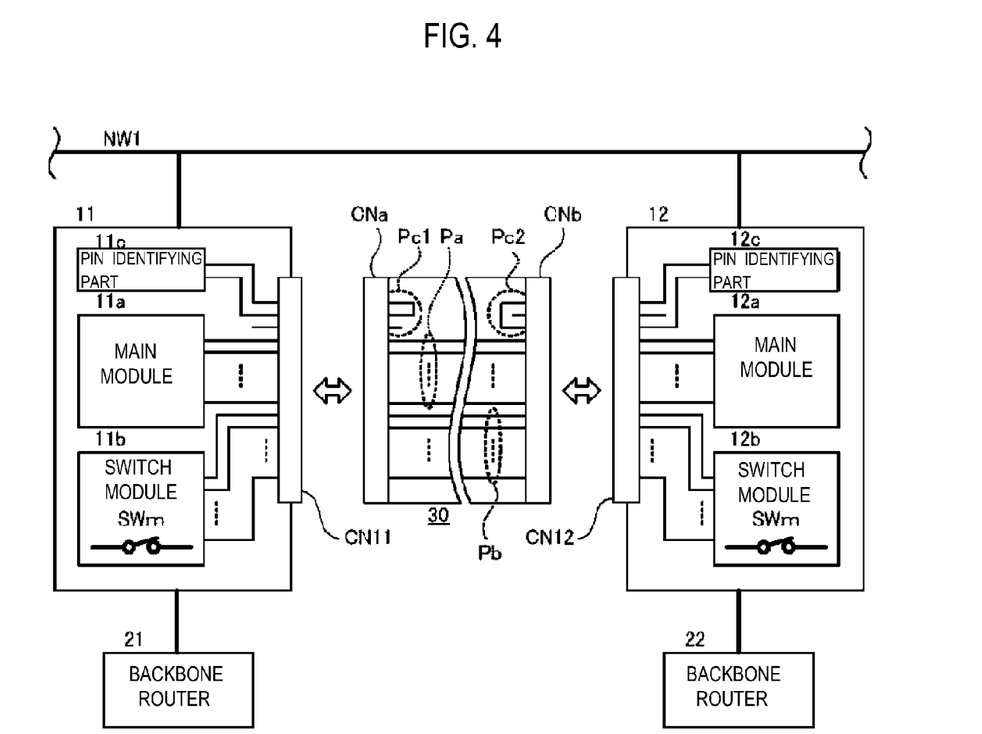
FIG. 4 is an explanatory view of a structure showing another exemplary embodiment of the present invention.

When the two backbone routers 21 and 22 are respectively directly connected to the field wireless management stations 11 and 12 without passing through the backbone network NW3 like the conventional structure shown in FIG. 7, as shown in FIG. 4, the switches SWm are set to on states.

As a result, the backbone routers 21 and 22 are redundantly connected through the field wireless management stations 11 and 12.

A redundant operation carried out when an abnormality occurs will be described below.

As a precondition, in order to realize the redundant operation, the main modules 11a and 12a are supposed, as describe above, to periodically transmit and receive their information through the synchronizing cable 30 so as to make the equalization of information.

Under a state that the switches SWm are turned off as shown in FIG. 3, and the backbone routers 21 and 22 are redundantly connected to the field wireless management stations 11 and 12 through the backbone network NW3, when a disconnection of a cable forming the backbone network NW3 or a trouble in the layer-2-switches SW1 to SW4 themselves occurs, communicativeness to the field wireless management stations connected to the cable or the layer-2-switches is deteriorated.

For instance, when the trouble occurs in the cable which connects the layer-2-switch SW1 to the field wireless management station 11 or the layer-2-switch SW1, the communicativeness to the field wireless management station 11 is deteriorated.

Figure 5:
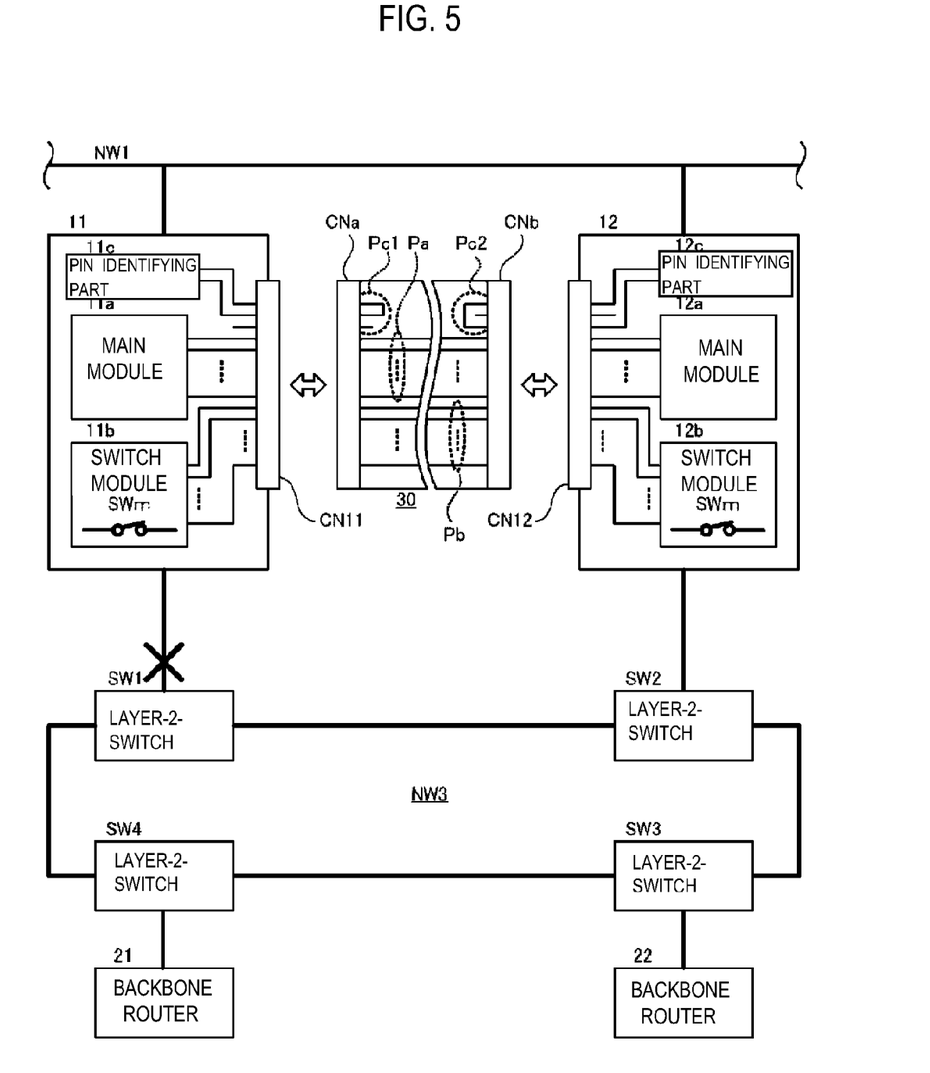
FIG. 5 is an explanatory view of a case when switches SWm are turned on in The structure shown in FIG. 1.

Thus, for instance, in the main module 11a of the field wireless management station 11, a unit is provided which monitors connected states respectively of ports of the layer-2-switch SW1 to be connected to the field wireless management station 11. When such a trouble as to deteriorate the communicativeness to the field wireless management station 11 occurs, as shown in FIG. 5, the switches SWm are turned on to ensure the communicativeness to the field wireless management station 11 through the field wireless management station 12.

After that, when the disconnection of the cable or the trouble of the layer-2-switch SW1 is fixed by a maintenance or an exchange, the switches SWm are turned off again.

Thus, a time can be suppressed to a minimum during which it is impossible to make a communication when the trouble occurs in any of the field wireless management stations formed to be redundant.

When the identifying pins are also included in the connectors CNa and CNb which function as the synchronizing connectors, individual identifiers can be respectively added to the two field wireless management stations 11 and 12 to prevent a mistake in setting.

Further, when the synchronizing connectors are not connected, the field wireless management stations are not allowed to be activated. Thus, a wrong operation due to a mistake in connection can be prevented.

Further, signals of the synchronizing network and the backbone network which pass through the synchronizing cable 30 are duplicated, so that reliability can be improved.

Further, the power wire is allowed to pass through the synchronizing cable, so that the power source can be also made to be redundant.

As described above, according to the present invention, the network management system can be realized which can suppress to a minimum the time during which it is impossible to make a communication when the trouble occurs in any of the field wireless management stations formed to be redundant.

The above-mentioned description merely shows a specifically preferable exemplary embodiment for the purpose of explanation and exemplification of the present invention. Accordingly, the present invention is not limited to the above-described exemplary embodiment and includes more changes and modifications within a range that does not deviate from an essence thereof.

This application is based on Japanese Patent Application (No. 2012-147174) filed on Jun. 29, 2012, and contents thereof are incorporated herein as a reference.

DESCRIPTION OF REFERENCE NUMERALS AND SIGNS 11, 12 . . . field wireless management station 11a, 12a . . . main module 11b, 12b . . . switch module 11c, 12c . . . pin identifying part CN 11, CN 12 . . . connector NW1 . . . host network 21, 22 . . . backbone router NW3 . . . backbone network 30 . . . synchronizing cable CNa, CNb . . . connector (synchronizing connector) Pa, Pb, Pc1, Pc2 . . . group of signal wires Pc11, Pc12, Pc21, Pc 23 . . . signal wire SW1 to SW4 . . . layer-2-switch SWm . . . switch

The invention claimed is:

1. A network management system for redundantly connecting field wireless management stations comprising:
 a plurality of field wireless management stations having gateway functions and system management functions incorporated; and
 a synchronizing cable and connectors provided in the synchronizing cable,
 wherein the field wireless management stations include at least switch modules,
 wherein the plurality of field wireless management stations are directly connected to each other through the synchronizing cable and the synchronizing connectors provided in the synchronizing cable, the synchronizing cable comprising a signal wire without further components that directly connects the synchronizing connectors, and switches are connected in series to a synchronizing system which connects the switch modules to each other to turn on and off the system, and
 wherein the synchronizing cable comprises a first group of signal wires associated with a first connector, the first group of signal wires comprising a first short circuit connection, and a second group of signal wires associated with a second connector, the second group of signal wires comprising a second short circuit connection.

2. The network management system according to claim 1, wherein backbone routers are redundantly connected to each of the redundantly connected field wireless management stations through layer-2-switches which are connected together in the form of a loop.

3. A network management system for redundantly connecting field wireless management stations comprising:
 a plurality of field wireless management stations having gateway functions and system management functions incorporated; and
 a synchronizing cable and connectors provided in the synchronizing cable,
 wherein the field wireless management stations include at least switch modules,
 wherein the plurality of field wireless management stations are connected to each other through the synchronizing cable and the synchronizing connectors provided in the synchronizing cable, and switches are connected in series to a synchronizing system which connects the switch modules to each other to turn on and off the system,
 wherein the plurality of redundantly connected field wireless management stations are connected so as to be individually identified by the synchronizing cable and the synchronizing connectors, and
 wherein the synchronizing cable comprises a first group of signal wires associated with a first connector, the first group of signal wires comprising a first short circuit connection, and a second group of signal wires associated with a second connector, the second group of signal wires comprising a second short circuit connection.

4. A network management system for redundantly connecting field wireless management stations comprising:
 a plurality of field wireless management stations having gateway functions and system management functions incorporated; and
 a synchronizing cable and connectors provided in the synchronizing cable,
 wherein the field wireless management stations include at least switch modules,
 wherein the plurality of field wireless management stations are connected to each other through the synchronizing cable and the synchronizing connectors provided in the synchronizing cable, and switches are connected in series to a synchronizing system which connects the switch modules to each other to turn on and off the system,
 wherein the synchronizing cable and the synchronizing connectors also include a power wire, and
 wherein the synchronizing cable comprises a first group of signal wires associated with a first connector, the first group of signal wires comprising a first short circuit connection, and a second group of signal wires associated with a second connector, the second group of signal wires comprising a second short circuit connection.

5. A network management system for redundantly connecting field wireless management stations comprising:
 a plurality of field wireless management stations having gateway functions and system management functions incorporated; and
 a synchronizing cable and connectors provided in the synchronizing cable,
 wherein the field wireless management stations include at least switch modules,
 wherein the plurality of field wireless management stations are connected to each other through the synchronizing cable and the synchronizing connectors provided in the synchronizing cable, and switches are connected in series to a synchronizing system which connects the switch modules to each other to turn on and off the system, wherein it is detected whether the synchronizing cable and the synchronizing connectors are pulled out from or inserted into at least one of the field wireless management stations in accordance with a function which individually identifies the plurality of redundantly connected field wireless management stations by the synchronizing cable and the synchronizing connectors, and wherein the synchronizing cable comprises a first group of signal wires associated with a first connector, the first group of signal wires comprising a first short circuit connection, and a second group of signal wires associated with a second connector, the second group of signal wires comprising a second short circuit connection.

* * * * *